(12) United States Patent
Kobayashi et al.

(10) Patent No.: US 11,884,280 B2
(45) Date of Patent: Jan. 30, 2024

(54) VEHICLE CONTROL DEVICE, VEHICLE CONTROL METHOD, AND NON-TRANSITORY COMPUTER READABLE MEDIUM STORING VEHICLE CONTROL PROGRAM

(71) Applicant: Toyota Jidosha Kabushiki Kaisha, Toyota (JP)

(72) Inventors: Hideki Kobayashi, Miyoshi (JP); Akihiro Muguruma, Nagoya (JP); Yukiya Sugiyama, Toyota (JP); Shota Higashihara, Chiryu (JP); Riho Matsuo, Nagoya (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 16/234,721

(22) Filed: Dec. 28, 2018

(65) Prior Publication Data
US 2019/0210607 A1 Jul. 11, 2019

(30) Foreign Application Priority Data
Jan. 11, 2018 (JP) .................................. 2018-002917

(51) Int. Cl.
*B60W 40/08* (2012.01)
*B60W 10/30* (2006.01)
(Continued)

(52) U.S. Cl.
CPC ........... *B60W 40/08* (2013.01); *B60R 25/257* (2013.01); *B60W 10/06* (2013.01); *B60W 10/30* (2013.01); *B60W 50/08* (2013.01); *G10L 15/22* (2013.01); *B60R 25/25* (2013.01); *B60W 2040/089* (2013.01); *B60W 2040/0836* (2013.01); *B60W 2540/21* (2020.02); *B60W 2540/24* (2013.01); *B60W 2540/26* (2013.01);
(Continued)

(58) Field of Classification Search
CPC ............................................ B60W 2040/0836
See application file for complete search history.

(56) References Cited

U.S. PATENT DOCUMENTS 5,983,189 A 11/1999 Lee
2010/0010689 A1* 1/2010 Yasushi .................. G08B 21/06
701/1

(Continued)

FOREIGN PATENT DOCUMENTS

CN 104149736 A 11/2014
CN 105235643 A * 1/2016
(Continued)

*Primary Examiner* — Imran K Mustafa
(74) *Attorney, Agent, or Firm* — Dinsmore & Shohl LLP

(57) ABSTRACT

A vehicle control device includes: a speech acquiring section that acquires speech data related to a speech of a speaker; a state acquiring section that acquires information indicating whether or not a driver attempting to start driving a vehicle is in an intoxicated state based on the speech data; and a control section configured to limit a start operation of the vehicle in a case in which the information indicates that the driver is in the intoxicated state, the start operation being an operation performed by the driver with respect to the vehicle to start driving the vehicle.

14 Claims, 6 Drawing Sheets

(51) Int. Cl.
  *B60W 10/06* (2006.01)
  *B60W 50/08* (2020.01)
  *G10L 15/22* (2006.01)
  *B60R 25/25* (2013.01)

(52) U.S. Cl.
  CPC ..... *B60W 2710/06* (2013.01); *B60W 2710/30* (2013.01); *G10L 2015/223* (2013.01)

(56) References Cited

U.S. PATENT DOCUMENTS

| | | | |
|---|---|---|---|
| 2012/0112879 A1* | 5/2012 | Ekchian | A61B 5/14546 |
| | | | 340/5.53 |
| 2016/0318521 A1* | 11/2016 | Nothacker | A61B 5/082 |
| 2017/0096145 A1* | 4/2017 | Bahn | B60Q 9/00 |
| 2017/0242428 A1* | 8/2017 | Pal | H04W 12/06 |
| 2017/0248952 A1* | 8/2017 | Perkins | B60W 50/082 |
| 2018/0168464 A1* | 6/2018 | Barnett, Jr. | A61B 5/6861 |

FOREIGN PATENT DOCUMENTS

| | | |
|---|---|---|
| JP | 2009-029374 A | 2/2009 |
| JP | 2009-096327 A | 5/2009 |
| JP | 2009-255766 A | 11/2009 |
| JP | 2009-300537 | 12/2009 |
| JP | 2010-015027 A | 1/2010 |
| JP | 2010-052635 A | 3/2010 |

\* cited by examiner

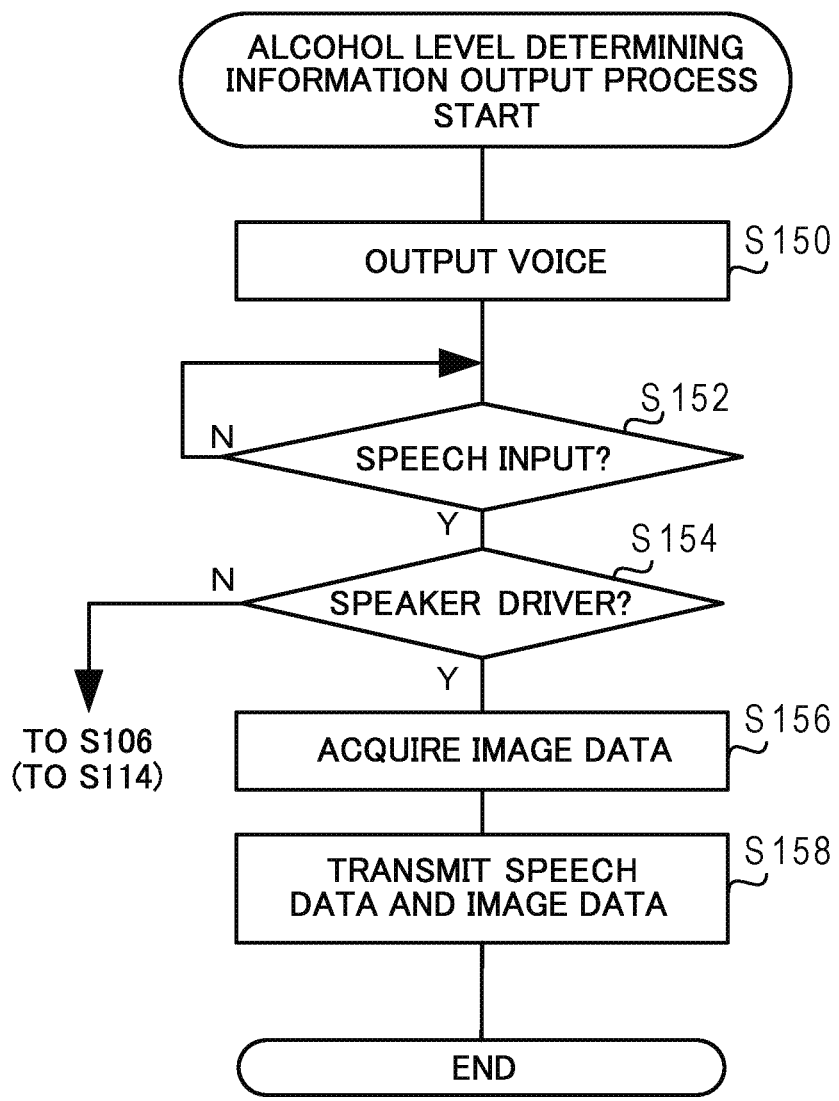

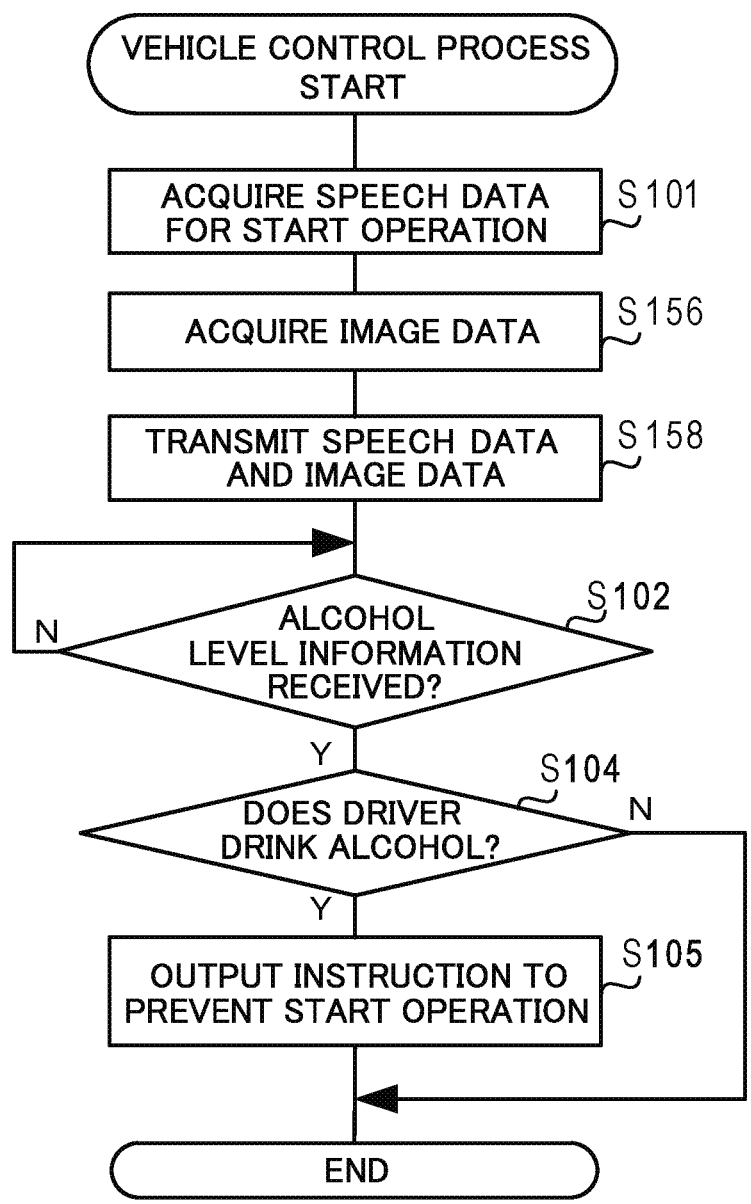

VEHICLE CONTROL DEVICE, VEHICLE CONTROL METHOD, AND NON-TRANSITORY COMPUTER READABLE MEDIUM STORING VEHICLE CONTROL PROGRAM

CROSS-REFERENCE TO RELATED APPLICATION

This application claims priority under 35 USC 119 from Japanese Patent Application No. 2018-002917, filed on Jan. 11, 2018 the disclosure of which is incorporated by reference herein.

BACKGROUND

Technical Field

The present disclosure relates to a vehicle control device, a vehicle control method, and a non-transitory computer readable medium storing a vehicle control program.

Related Art

Japanese Patent Application Laid-Open (JP-A) No. 2009-300537 discloses a technique of actuating a vehicle device communicating with a mobile terminal device by a voice recognized by the mobile terminal device. In the technique described in JP-A No. 2009-300537, the mobile terminal device extracts a voice related to a specific user among input sounds based on a learning result obtained by learning the voice of the specific user, and actuates the vehicle device by the extracted voice.

However, in the technique described in JP-A No. 2009-300537, in a case in which a driver inputs his/her voice to the mobile terminal device, the vehicle device is actuated regardless of whether or not the driver is in an intoxicated state. For this reason, the technique described in JP-A No. 2009-300537 may not prevent intoxicated driving.

SUMMARY

The present disclosure provides a vehicle control device, a vehicle control method, and a non-transitory computer readable medium storing a vehicle control program that may prevent driving in an intoxicated state.

A first aspect of the present disclosure is a vehicle control device including: a speech acquiring section that acquires speech data related to a speech of a speaker; a state acquiring section that acquires information indicating whether or not a driver attempting to start driving a vehicle is in an intoxicated state based on the speech data; and a control section configured to limit a start operation of the vehicle in a case in which the information indicates that the driver is in the intoxicated state, the start operation being an operation performed by the driver with respect to the vehicle to start driving the vehicle.

According to the vehicle control device of the first aspect, in a case in which it is determined that the driver is in the intoxicated state based on the speech data, the start operation of the vehicle is limited. Here, the start operation is an operation performed by the driver with respect to the vehicle to start driving the vehicle. Therefore, according to the vehicle control device of the first aspect, in a case in which the driver is in the intoxicated state, the start operation of the vehicle is limited, and thus, intoxicated driving may be prevented.

Note that the "driver" is not limited to a person that is currently driving the vehicle, but includes a person attempting to drive the vehicle. Further, the "intoxicated state" refers to at least a state in which the driver drinks the alcohol or a state under the influence of the alcohol in accordance with law and regulations such as the Road Traffic Act (drunk state).

According to a second aspect of the present disclosure, in the first aspect, limiting the start operation may include at least one of preventing the start operation or preventing an operation of the vehicle corresponding to the start operation.

According to the vehicle control device of the second aspect, in a case in which the driver is in the intoxicated state, at least one of the control to prevent the start operation or the control to prevent the operation of the vehicle corresponding to the start operation is performed. Thus, a second aspect of the present disclosure may prevent the driver to perform the start operation, and may prevent the vehicle be operated even though the driver has performed the start operation. Therefore, the vehicle control device according to the second aspect may prevent the intoxicated driving.

A third aspect of the present disclosure, in the above aspects, may further include an output section that outputs a voice urging a response by the speaker, the speech acquiring section may acquire, from the speaker, a response to the voice output from the output section as the speech.

According to the vehicle control device of the third aspect, the voice for urging the answer is output, and may urge the speech by the speaker for acquiring information indicating whether or not the driver is in the intoxicated state.

According to a fourth aspect of the present disclosure, in the above aspects, the start operation may be performed by the speech of the driver, and the speech acquiring section may acquire speech data from the speech for performing the start operation.

According to the vehicle control device of the fourth aspect, the information indicating whether or not the driver is in the intoxicated state is information based on the speech data of the speech of the driver for performing the start operation. Accordingly, the vehicle control device of the fourth aspect may rapidly limit the start operation.

A fifth aspect of the present disclosure, in the above aspects, may further include: a detection section that detects at least one of a complexion, a facial expression, or a motion of the driver, the state acquiring section may acquire the information based on a detection result of the detection section and the speech data.

According to the vehicle control device of the fifth aspect, the information indicating whether or not the driver is in the intoxicated state is information based on the speech data indicated by the speech and at least one of the complexion, the facial expression, and the motion of the driver. Accordingly, the vehicle control device of the fifth aspect may increase accuracy of the information indicating whether or not the driver is in the intoxicated state.

A sixth aspect of the present disclosure, in the above aspects, may further include: a determining section that determines whether or not the speaker indicated by the speech data is the driver, the control section may perform the limitation in a case in which the determining section determines that the speaker is the driver.

According to the vehicle control device of the sixth aspect, the information indicating whether or not the driver is in the intoxicated state is information based on the speech data spoken by the driver. Accordingly, the vehicle control device of the sixth aspect may increase accuracy of the information indicating whether or not the driver is in the intoxicated state.

According to a seventh aspect of the present disclosure, in the above aspects, the start operation may include opening a driver's door of the vehicle.

According to the vehicle control device of the seventh aspect, in the case in which the driver is in the intoxicated state, the operation of opening the driver's door of the vehicle is limited. Accordingly, the vehicle control device of the seventh aspect may prevent the driver in the intoxicated state from getting in the driver's seat.

According to an eighth aspect of the present disclosure, in the above aspects, the start operation may include starting an engine of the vehicle.

According to the vehicle control device according to the eighth aspect, in the case in which the driver is in the intoxicated state, the operation of starting the engine of the vehicle is limited. Accordingly, the vehicle control device according to the eighth aspect may prevent the driver in the intoxicated state from starting the engine of the vehicle.

According to a ninth aspect of the disclosure, in the above aspects, the vehicle control device may be an artificial intelligence speaker.

According to the vehicle control device of the ninth aspect, an operation of the vehicle is controlled by the AI speaker. Accordingly, the vehicle control device of the ninth aspect may prevent the intoxicated driving. Further, the vehicle control device according to the ninth aspect may simplify a configuration of the vehicle control device.

A tenth aspect of the disclosure is a vehicle control method including: acquiring speech data from a speech of a speaker; acquiring information indicating whether or not a driver attempting to start driving a vehicle is in an intoxicated state based on the speech data; and limiting a start operation of the vehicle in a case in which the information indicates that the driver is in the intoxicated state, the start operation being an operation performed by the driver with respect to the vehicle to start driving the vehicle.

According to the vehicle control method of the tenth aspect, as in the first aspect, in a case in which it is determined that the driver is in the intoxicated state based on the speech data, the start operation of the vehicle is limited. Here, the start operation is an operation performed by the driver with respect to the vehicle to start driving the vehicle. Therefore, according to the vehicle control device of the tenth aspect, in a case in which the driver is in the intoxicated state, the start operation of the vehicle is limited, and thus, intoxicated driving may be prevented.

An eleventh aspect of the disclosure is a non-transitory computer readable medium storing a vehicle control program causing a computer to execute a process for controlling a vehicle, the process including: acquiring speech data from a speech of a speaker; acquiring information indicating whether or not a driver attempting to start driving a vehicle is in an intoxicated state based on the speech data; and limiting a start operation of the vehicle in a case in which the information indicates that the driver is in the intoxicated state, the start operation being an operation performed by the driver with respect to the vehicle to start driving the vehicle.

According to the non-transitory computer readable medium storing a vehicle control program of the eleventh aspect, as in the first aspect, in a case in which it is determined that the driver is in the intoxicated state based on the speech data, the start operation of the vehicle is limited. Here, the start operation is an operation performed by the driver with respect to the vehicle to start driving the vehicle.

Therefore, according to the vehicle control device of the eleventh aspect, in a case in which the driver is in the intoxicated state, the start operation of the vehicle is limited, and thus, intoxicated driving may be prevented.

According to the above aspects, the present disclosure may provide a vehicle control device, a vehicle control method, and a non-transitory computer readable medium storing a vehicle control program that may prevent intoxicated driving.

BRIEF DESCRIPTION OF THE DRAWINGS

Exemplary embodiments will be described in detail based on the following figures, wherein:

FIG. 6 is a flowchart showing an alcohol level determining information output process in the vehicle control processing shown in FIG. 5; and FIG. 7 is a flowchart showing a vehicle control process executed by the vehicle control device according to the exemplary embodiment.

DETAILED DESCRIPTION

Hereinafter, exemplary embodiments of the disclosure will be described in detail with reference to the drawings.

Figure 1:
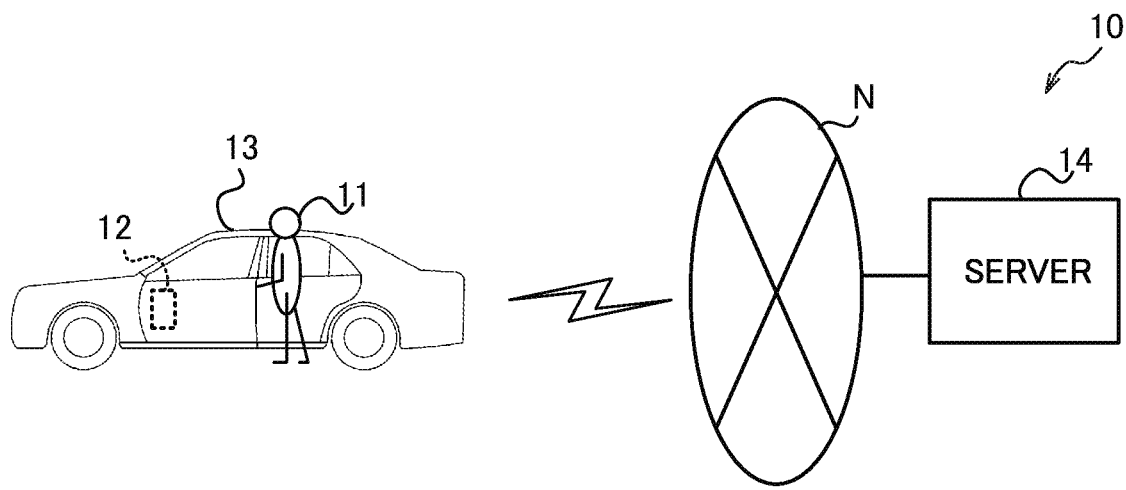
FIG. 1 is a diagram showing a configuration of a vehicle control system according to an exemplary embodiment.

First, a configuration of a vehicle control system 10 according to the present exemplary embodiment will be described with reference to FIG. 1. As shown in FIG. 1, the vehicle control system 10 according to the present exemplary embodiment includes a vehicle control device 12 and a server 14.

The vehicle control device 12 according to the present exemplary embodiment is mounted in advance in a vehicle 13, but may be brought from the outside into the vehicle 13 by a driver 11. The vehicle control device 12 according to the present exemplary embodiment performs a control related to an operation (hereinafter, referred to as a "start operation") performed by the driver 11 on the vehicle 13 in order to start driving the vehicle 13, based on an alcohol level of the driver 11. In the present exemplary embodiment, an operation of opening a driver's door of the vehicle 13 from the outside (hereinafter, referred to as an "opening operation") and an operation of starting an engine of the vehicle 13 (hereinafter, referred to as a "starting operation") will be described as specific examples of the start operation. Note that the start operation is not limited to these specific examples, and may be, for example, an operation of putting a gear into a drive mode, or the like.

The server 14 according to the present exemplary embodiment determines the alcohol level of the driver 11 (whether or not the driver is in an intoxicated state) based on alcohol level determining information acquired from the vehicle control device 12, and transmits a determination result to the vehicle control device 12.

The vehicle control device 12 and the server 14 are connected to a network N by wireless communication. Therefore, the vehicle control device 12 and the server 14 can communicate with each other through the network N.

Next, hardware configurations of the vehicle control device 12 and the server 14 will be described.

First, a hardware configuration of the vehicle control device 12 will be described with reference to FIG. 2. Examples of the vehicle control device 12 according to the present exemplary embodiment can include an artificial intelligence (AI) speaker, a smartphone, a mobile information terminal device, and the like.

Figure 2:
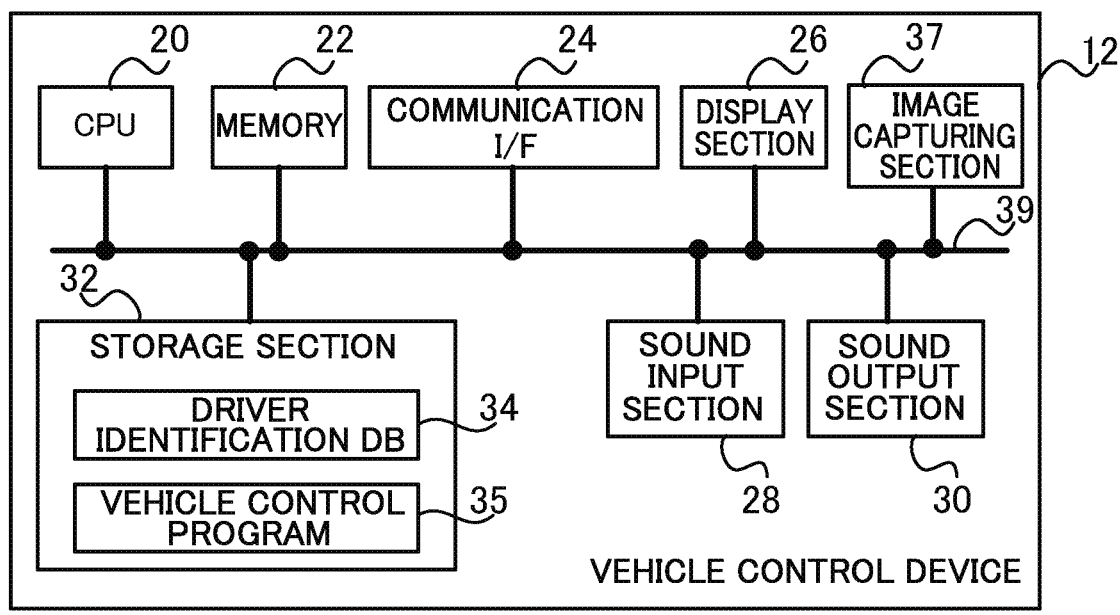
FIG. 2 is a block diagram showing a hardware configuration of a vehicle control device according to the exemplary embodiment.

As shown in FIG. 2, the vehicle control device 12 includes a central processing unit (CPU) 20 and a memory 22 as a temporary storage area. Further, the vehicle control device 12 includes a communication interface (I/F) 24 used for performing communication with an external device, a display section 26 such as a liquid crystal display, a sound input section 28, a sound output section 30, a storage section 32 that is non-volatile, and an image capturing section 37. The CPU 20, the memory 22, the communication I/F 24, the display section 26, the sound input section 28, the sound output section 30, the storage section 32, and the image capturing section 37 are connected to a bus 39.

The sound input section 28 according to the present exemplary embodiment is a microphone, or the like, that can input a voice (sound) at an outer portion of the vicinity of the driver's door of the vehicle 13 and a voice (sound) at the driver's seat side of the vehicle 13. The sound output section 30 is a speaker, or the like, outputting a voice (sound), and can output a voice (sound) to the outer portion of the vicinity of the driver's door of the vehicle 13 and the driver's seat side of the vehicle 13. Note that, in a case in which the vehicle control device 12 is the AI speaker, an external device including a sound input section that can input a voice at the outer portion of the vicinity of the driver's door of the vehicle 13 and a sound output section that can output a voice to the outer portion of the vicinity of the driver's door of the vehicle 13 may be configured to be communicably connected to the vehicle control device 12 by Bluetooth (registered trademark), or the like.

Further, the image capturing section 37 is a camera, or the like, for capturing an image of the driver 11, that can at least capture an image of a face of a person standing near a door knob of the driver's door of the vehicle 13 and an area including a face of a person sitting in the driver's seat of the vehicle 13. Note that, in the present exemplary embodiment, a case in which the vehicle control device 12 includes the image capturing section 37 is described. However, the image capturing section 37 may be provided as a device external to the vehicle control device 12. The image capturing section 37 according to the present exemplary embodiment is an example of a detecting section according to the disclosure.

The storage section 32 stores a driver identification database (DB) 34 used for determining whether or not the voice input from the sound input section 28 is a voice by a speech of the driver 11. Further, the storage section 32 stores a vehicle control program 35 for executing a vehicle control process of controlling an operation of the vehicle 13 based on the alcohol level of the driver 11, specifically, an operation of the vehicle 13 in starting driving the vehicle 13.

Next, a hardware configuration of the server 14 will be described with reference to FIG. 3. Examples of the server 14 according to the present exemplary embodiment can include a server computer such as a so-called cloud server.

Figure 3:
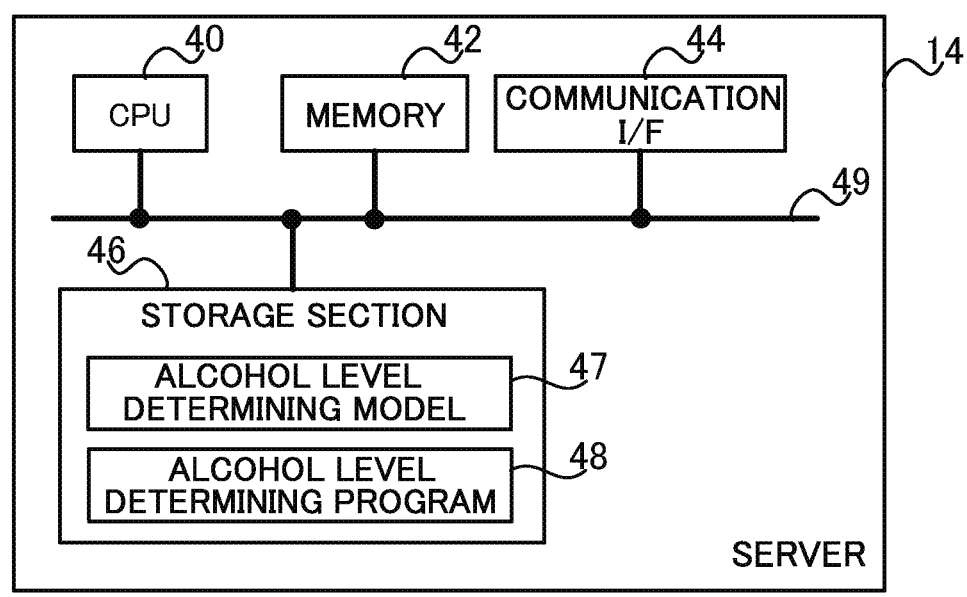
FIG. 3 is a block diagram showing a hardware configuration of a server according to the exemplary embodiment.

As shown in FIG. 3, the server 14 includes a CPU 40 and a memory 42 as a temporary storage area. Further, the server 14 includes a communication I/F 44 used at the time of performing communication with an external device, and a storage section 46 that is non-volatile. The CPU 40, the memory 42, the communication I/F 44, and the storage section 46 are connected to a bus 49.

The storage section 46 stores an alcohol level determining model 47. The alcohol level determining model 47 is a learned model including a speech data of a speaker (the driver 11) and an image data of the speaker as an input, and including information (hereinafter, referred to as "information indicating an alcohol level") indicating whether or not the speaker corresponding to the input speech data and image data is in the intoxicated state as an output. From the speech data, for example, data indicating a time required to speak a word, a sentence extracted from the input speech data, a content that the extracted word or sentence directly or indirectly means, a rhythm of a speech including a tone, an interval of the speech, and the like, are used as teaching data. Further, from the image data, for example, a complexion, a facial expression, and a motion of the speaker (a person whose image is captured) are used as teaching data. The alcohol level determining model 47 is constructed by machine learning using plural data pairs as learning data. The plural data pairs are configured by pairing the teaching data and output data with each other. The output data indicates the alcohol level of the speaker at the time of performing a speech indicated by the speech data. Note that a method of the machine learning is not particularly limited, and for example, known machine learning methods such as a support vector machine (SVM), a Gaussian mixture model (GMM), a hidden Markov model (HMM), and a neural network (NN) may be used.

Further, the storage section 46 stores an alcohol level determining program 48 for executing an alcohol level determining process (to be described in detail below) of determining the alcohol level using the alcohol level determining model 47.

Next, a functional configuration of the vehicle control system 10 according to the present exemplary embodiment will be described with reference to FIG. 4.

Figure 4:
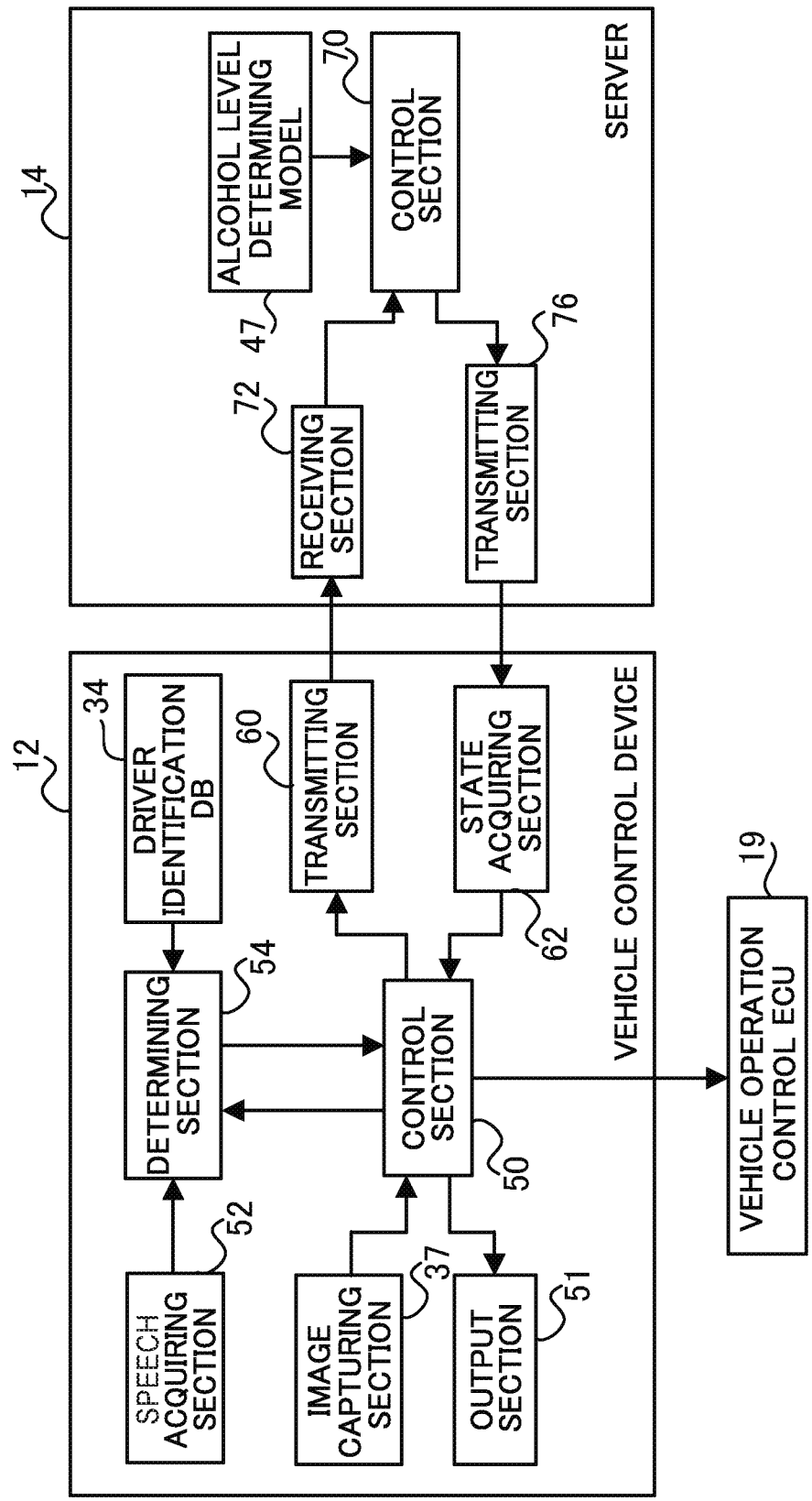
FIG. 4 is a block diagram showing a functional configuration of the vehicle control system according to the exemplary embodiment.

As shown in FIG. 4, the vehicle control device 12 includes a control section 50, an output section 51, a speech acquiring section 52, a determining section 54, a transmitting section 60, and a state acquiring section 62. The CPU 20 of the vehicle control device 12 functions as the control section 50, the output section 51, the speech acquiring section 52, the determining section 54, the transmitting section 60, and the state acquiring section 62 shown in FIG. 4 by executing the vehicle control program 35 stored in the storage section 32.

The output section 51 outputs a voice for asking the driver 11 an effective predetermined question, or the like, in order to determine the alcohol level, as a voice for urging an answer, through the sound output section 30.

The speech acquiring section 52 acquires a speech data of a voice of the driver 11, or the like, input from the sound input section 28, and outputs the speech data to the determining section 54. The determining section 54 determines whether or not the speech data acquired by the speech acquiring section 52 is a speech data of the speech of the driver 11 with reference to the driver identification DB 34, and outputs a determination result and the speech data to the control section 50.

The driver identification DB 34 stores information required for identifying the driver 11 by the speech data. Examples of such information can include a voice data of the driver 11 for performing voice recognition by an existing speech recognition technique, but are not particularly limited, and may include information on a habit, or the like, of the speech of the driver 11.

The control section 50 controls the overall operation of the vehicle control device 12. Further, the control section 50 outputs the speech data input from the determining section 54 and the image data acquired by the image capturing section 37 to the transmitting section 60, based on the determination result input from the determining section 54. Further, the control section 50 outputs instructions related to an opening operation and a starting operation for the vehicle 13 to a vehicle operation control electronic control unit (ECU) 19, based on information indicating an alcohol level, acquired by the state acquiring section 62. The vehicle operation control ECU 19 is provided in the vehicle 13, and has a function of controlling the overall operation of the vehicle 13.

The transmitting section 60 transmits the speech data and the image data to the server 14 through the communication I/F 24. The state acquiring section 62 acquires the information indicating the alcohol level of the driver 11 from the server 14 through the communication I/F 24, and outputs the acquired information indicating the alcohol level to the control section 50.

As shown in FIG. 4, the server 14 includes a control section 70, a receiving section 72, and a transmitting section 76. The CPU 40 of the server 14 functions as the control section 70, the receiving section 72, and the transmitting section 76 shown in FIG. 4 by executing the alcohol level determining program 48 stored in the storage section 46.

The receiving section 72 receives the speech data and the image data from the vehicle control device 12 through the communication I/F 44, and outputs the speech data and the image data to the control section 70. The transmitting section 76 transmits the information indicating the alcohol level, input from the control section 70 to the vehicle control device 12 through the communication I/F 44.

The control section 70 controls the overall operation of the server 14. Further, the control section 70 determines the alcohol level of the driver 11 using the alcohol level determining model 47 based on the speech data and the image data input from the receiving section 72, and outputs the information indicating the alcohol level as a determination result to the transmitting section 76.

Next, an operation of the vehicle control device 12 according to the present exemplary embodiment will be described.

Figure 5:
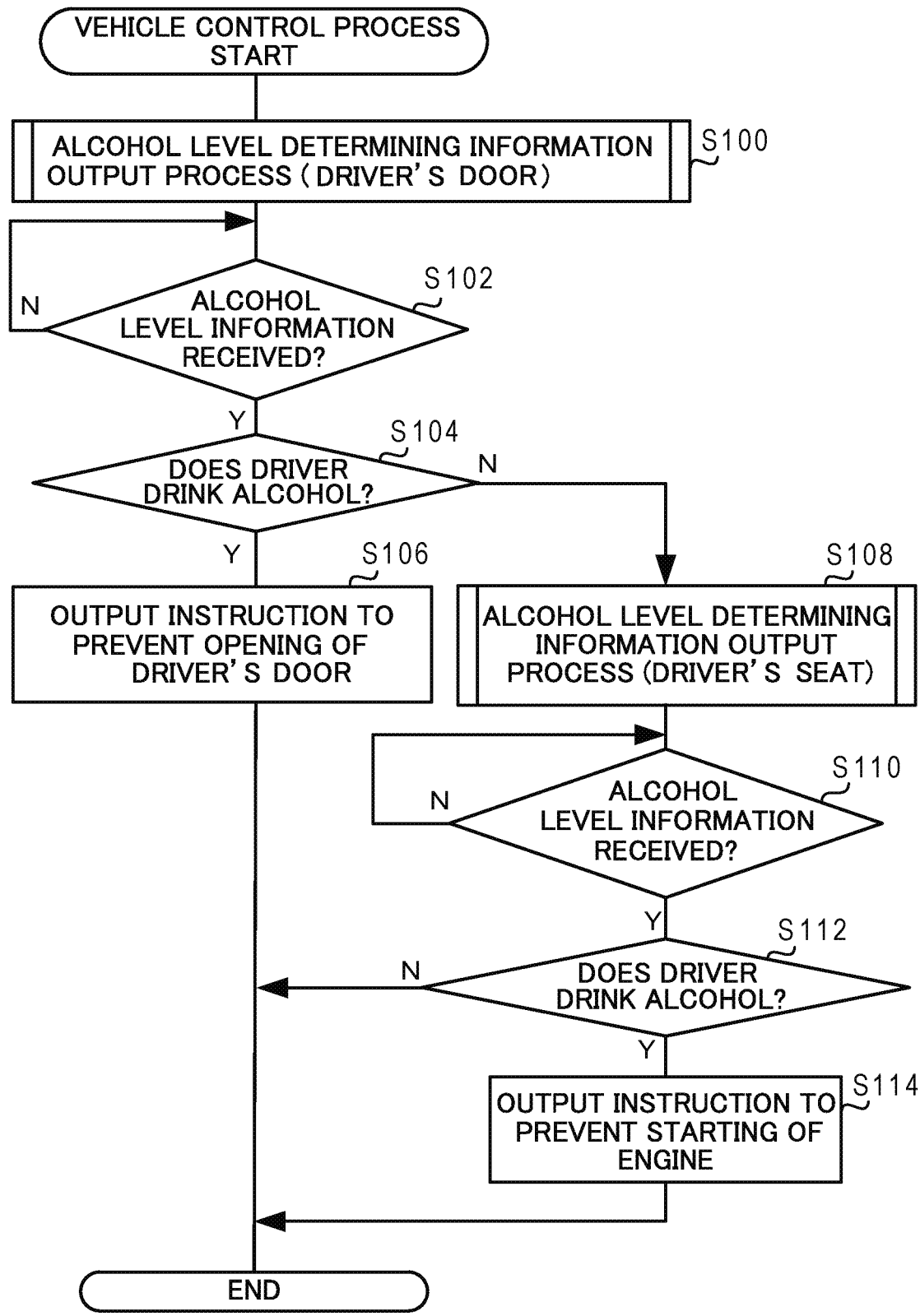
FIG. 5 is a flowchart showing a vehicle control process executed by the vehicle control device according to the exemplary embodiment.

A vehicle control process performed by the vehicle control device 12 will be described with reference to FIGS. 5 and 6. FIG. 5 is a flowchart showing an example of a flow of a vehicle control process executed by the CPU 20 of the vehicle control device 12 according to the exemplary embodiment. As described above, in the present exemplary embodiment, the vehicle control process shown in FIG. 5 is executed by executing the vehicle control program 35 stored in advance in the storage section 32 by the CPU 20.

In the present exemplary embodiment, as an example, in a case in which a person such as the driver 11 is detected in the vicinity of the driver's door of the vehicle 13, the vehicle control process in FIG. 5 is executed by the vehicle control device 12. Note that a method of detecting the person by the vehicle control device 12 is not particularly limited. For example, an infrared sensor, or the like, for detecting the person may be provided toward the outside of the driver's door, and the person may be detected using the infrared sensor.

In step S100 shown in FIG. 5, an alcohol level determining information output process is performed in order to output the speech data and the image data, which are information for determining the alcohol level, to the server 14. The alcohol level determining information output process in the present step S100 is performed based on the speech input from the driver's door side. FIG. 6 is a flowchart showing an example of a flow of the alcohol level determining information output process.

In step S150 shown in FIG. 6, the output section 51 outputs the voice (sound) such as the question for the driver 11 through the sound output section 30. The person such as the driver 11 performs the speech in response to the voice.

For this reason, in the next step S152, the speech acquiring section 52 determines whether or not the speech has been input through the sound input section 28. Until the speech is input, a negative determination is made in step S152. On the other hand, when the speech is input, an affirmative determination is made in step S152, and the alcohol level determining information output process proceeds to step S154. The speech data corresponding to the speech input as described above is obtained by the speech acquiring section 52, and is output to the determining section 54.

In step S154, the determining section 54 determines whether or not a speaker performing the speech is the driver 11 with reference to the driver identification DB 34. In a case in which the speaker performing the speech is not the driver 11, a negative determination is made in step S154, and the alcohol level determining information output process proceeds to step S106 of the vehicle control process shown in FIG. 5. On the other hand, in a case in which the speaker performing the speech is the driver 11, an affirmative determination is made in step S154, and the process proceeds to step S156. Note that in a case in which speech data of plural persons are included in the speech data acquired by the speech acquiring section 52, it is determined whether or not a speech data by the driver 11 is included in the speech data of the plural persons. Further, in this case, the speech data by the speech of the driver 11 is extracted from the speech data of the plural persons.

In step S156, the image capturing section 37 captures an image of the driver 11 to acquire the image data.

In the next step S158, in a case in which the transmitting section 60 transmits the speech data and the image data to the server 14, the alcohol level determining information output process ends. In this way, in a case in which the alcohol level determining information output process of step S100 of the vehicle control process shown in FIG. 5 ends, the process proceeds to step S102.

In the server 14 that has received the speech data and the image data from the vehicle control device 12, the control section 70 determines the alcohol level of the driver 11 using the alcohol level determining model 47.

Specifically, the CPU 40 executes the alcohol level determining process by executing the alcohol level determining program 48 stored in advance in the storage section 46. In the alcohol level determining process, a process of transmitting the output information indicating the alcohol level to the vehicle control device 12 is performed using the speech data and the image data received from the vehicle control device 12 as an input of the alcohol level determining model 47.

For this reason, in step S102, the state acquiring section 62 determines whether or not the information indicating the alcohol level has been received from the server 14. Until the information indicating the alcohol level is received, a negative determination is made in step S102. On the other hand, when the information indicating the alcohol level is received, an affirmative determination is made in step S102, and the process proceeds to step S104.

In step S104, the control section 50 determines whether or not the information indicating the alcohol level indicates that the driver 11 is in the intoxicated state, in other words, whether or not the driver 11 has drunk the alcohol. In a case in which the driver 11 is in the intoxicated state, an affirmative determination is made in step S104, and the process proceeds to step S106.

In step S106, the control section 50 outputs instructions to the vehicle operation control ECU 19 to limit opening and closing of the driver's door. In other words, the control section 50 prevents the opening of the driver's door, and the present vehicle control process ends. Note that the limitation on the opening and closing of the driver's door may be a limitation allowing the driver 11 not to perform an operation for opening and closing the driver's door, or may be a limitation allowing the driver's door not to be opened and closed (not to be opened) even though the driver 11 performs the operation for opening and closing the driver's door.

On the other hand, in a case in which the driver 11 is not in the intoxicated state, a negative determination is made in step S104, and the vehicle control process proceeds to step S108. In this case, the control section 50 does not instruct the vehicle operation control ECU 19 to prevent opening the driver's door, and the driver 11 can thus open the driver's door and get in the vehicle 13.

In the next step S108, the alcohol level determining information output process (see FIG. 6) described above is again performed. Note that the alcohol level determining information output process of the present step S108 is performed based on the speech of the speaker in the driver's seat. Note that the alcohol level determining information output process executed in the present step S108 is different from the alcohol level determining information output process of step S100, in that, in a case in which the negative determination is made in step S154 (namely, in a case in which the speaker is not the driver 11) the alcohol level determining information output process proceeds to step S114 of the vehicle control process shown in FIG. 5. Further, in a case in which the alcohol level determining information output process of the present step S108 ends, the process proceeds to step S110.

In step S110, the state acquiring section 62 determines whether or not the information indicating the alcohol level has been received from the server 14, as in step S102. Until the information indicating the alcohol level is received, a negative determination is made in step S110. On the other hand, in a case in which the information indicating the alcohol level is received, an affirmative determination is made in step S110, and the vehicle control process proceeds to step S112.

In step S112, the control section 50 determines whether or not the information indicating the alcohol level indicates that the driver 11 is in the intoxicated state, in other words, whether or not the driver 11 has drunk the alcohol, as in step S104. In a case in which the driver 11 is in the intoxicated state, an affirmative determination is made in step S112, and the process proceeds to step S114.

In step S114, the control section 50 outputs instructions to the vehicle operation control ECU 19 so as to limit starting of the engine. In other words, the control section 50 prevents the starting of the engine, and the present vehicle control process ends. Note that the limitation on the starting of the engine may be a limitation allowing the driver 11 not to perform an operation for starting the engine, or may be a limitation allowing the engine not to be started even though the driver 11 performs the operation for starting the engine.

On the other hand, in a case in which the driver 11 is not in the intoxicated state, a negative determination is made in step S114, and the present vehicle control process ends. In this case, the control section 50 does not instruct the vehicle operation control ECU 19 to prevent the starting of the engine, and the driver 11 can thus start the engine of the vehicle 13.

As described above, the vehicle control device 12 of the present exemplary embodiment controls the operation of the vehicle 13, and includes the speech acquiring section 52 that acquires the speech data from the speech of the speaker, the state acquiring section 62 that acquires the information indicating the alcohol level of the driver 11 attempting to start driving the vehicle 13 based on the speech data, and the control section 50 that performs the control relating to a limitation on the start operation, in a case in which the information acquired by the state acquiring section 62 indicates that the driver 11 is in the intoxicated state, the start operation being an operation for the vehicle 13 performed by the driver 11 in order to start driving the vehicle 13.

As described above, in a case in which it is determined that the driver 11 is in the intoxicated state based on the speech data by the speech, the vehicle control device 12 of the present exemplary embodiment limits the start operation of the vehicle by the driver 11 to start driving the vehicle 13. Therefore, in a case in which the driver is in the intoxicated state, the vehicle control device 12 of the present exemplary embodiment may limit the start operation, and may prevent intoxicated driving.

Further, in the present exemplary embodiment, when the driver 11 opens and closes the driver's door of the vehicle 13 and when the driver 11 starts the engine, in the case in which the driver 11 is in the intoxicated state, the start operation is limited. Therefore, in the present exemplary embodiment, the engine is not started in a case in which, after the driver 11 opens the driver's door of the vehicle 13 and gets in the vehicle 13 since the driver 11 is not in the intoxicated state, and for example, the driver 11 drinks the alcohol at the driver's seat and attempts to start the engine. As described above, the vehicle control device 12 of the present exemplary embodiment may limit each start operation by the driver 11, and may prevent the intoxicated driving.

Note that, in the present exemplary embodiment, a case in which the server 14 determines the alcohol level using the alcohol level determining model 47 has been described. However, other device such as the vehicle control device 12 may determine the alcohol level.

Further, in the present exemplary embodiment, a case in which the vehicle control device 12 outputs the voice for urging the answer in order to acquire the speech data for determining the alcohol level, has been described. However, the present disclosure is not limited thereto. In a case in which the start operation is performed by the speech of the driver 11, for example, in a case in which the driver 11 speaks "Open the driver's door", such that the driver's door is automatically opened, or the driver 11 speaks "Start the engine", such that the engine is automatically started, the alcohol level may be determined based on the speech of the driver 11.

FIG. 7 is a flowchart showing another example of a flow of a vehicle control process executed by the CPU 20 of the vehicle control device 12. The vehicle control process shown in FIG. 7 is executed by the vehicle control device 12 when the speech of the driver 11 performing the start operation is detected. In step S101 shown in FIG. 7, the speech acquiring section 52 acquires the speech data from the speech of the driver 11 performing the start operation. Then, processes of steps S156 and S158 of the abovementioned alcohol level determining information output process (see FIG. 6) are executed, the image capturing section 37 acquires the image data of the driver 11, and the transmitting section 60 transmits the speech data and the image data to the server 14. Therefore, as described above, the server 14 determines the alcohol level using the alcohol level determining model 47 based on the speech data and the image data, and transmits the information indicating the alcohol level. As in the abovementioned vehicle control process (see FIG. 5), each of processes of steps S102 and S104 is executed, such that when the state acquiring section 62 receives the information indicating the alcohol level, the control section 50 determines whether or not the driver 11 has drunk the alcohol. In the vehicle control process shown in FIG. 7, in a case in which the control section 50 determines that the driver 11 does not drink the alcohol, a negative determination is made in step S104, and the vehicle control process ends. On the other hand, in a case in which the control section 50 determines that the driver drinks the alcohol, an affirmative determination is made in step S104, and the vehicle control process proceeds to step S105. In step S105, the control section 50 outputs instructions to the vehicle operation control ECU 19 so as to limit the start operation, in other words, so as to prevent the start operation, and the vehicle control process then ends. As described above, the vehicle control process shown in FIG. 7 may prevent intoxicated driving of the driver 11, as in the abovementioned exemplary embodiment.

Further, in the present exemplary embodiment, a case in which the alcohol level of the driver 11 is determined based on the speech data and the image data, has been described. However, the disclosure is not limited thereto, and the alcohol level may be determined based on at least the speech data. For example, the alcohol level may be determined based on data indicating a concentration of alcohol contained in expiration of the driver 11 and the speech data. In this case, even though the concentration of alcohol contained in expiration is lower than a concentration at which it can be regarded as intoxicated driving or driving under the influence of alcohol according to law and regulations, in a case in which the driver 11 is in the intoxicated state, the start operation can be limited, such that it is possible to further prevent the intoxicated driving.

Further, a case in which the process performed by the CPU 20 in the present exemplary embodiment is a software process performed by executing the program has been described, but the process performed by the CPU 20 may be a process performed by hardware. Further, the process performed by the CPU 20 may be a process performed by combining software and hardware with each other. Further, the vehicle control program 35 stored in the storage section 32 may be stored and distributed in various storage media.

Further, the disclosure is not limited to the abovementioned exemplary embodiments, and it goes without saying that various modifications can be made without departing from the spirit of the disclosure, Further to the abovementioned exemplary embodiments.

What is claimed is:

1. A vehicle control device comprising:
    a central processing unit that acquires speech data related to a speech of a speaker, the central processing unit determines whether or not the speaker indicated by the speech data is a driver; and
    a camera that acquires image data including an image of the speaker;
    wherein the central processing unit transmits the speech data and the image data to an alcohol level determining model, the image data including a complexion, a facial expression, and a motion of the speaker,
    wherein the alcohol level determining model determines an alcohol level based on the speech data and the complexion, the facial expression, and the motion of the speaker from the image data;
    wherein the central processing unit:
    acquires the speech data from speech for performing a start operation, the start operation being an operation performed by the driver with respect to a vehicle to start driving the vehicle, wherein the start operation is performed by the speech of the driver;
    determines whether the speaker is in an intoxicated state outside of the vehicle, based on the alcohol level;
    upon determination that the speaker is in an intoxicated state outside of the vehicle, restricts an operation of opening a driver's door of the vehicle;
    upon determination that the speaker is not in an intoxicated state outside of the vehicle, and after an opening of the driver's door of the vehicle, determines whether the speaker is in an intoxicated state in a driver's seat of the vehicle, based on the alcohol level; and
    upon determination that the speaker is in an intoxicated state in the driver's seat of the vehicle, restricts starting of an engine of the vehicle.

2. The vehicle control device according to claim 1, further comprising an output section that outputs a voice urging a response by the speaker, wherein the central processing unit acquires, from the speaker, a response to the voice output from the output section as the speech.

3. The vehicle control device according to claim 1, wherein the vehicle control device is an artificial intelligence speaker.

4. The vehicle control device of claim 1, wherein the acquiring of the image data is performed in response to the acquiring of the speech data from the speech for performing the start operation.

5. The vehicle control device according to claim 1, wherein the central processing unit:
    in response to acquiring the speech data from the speech for performing the start operation, acquires the alcohol level indicating whether or not the driver attempting to start driving the vehicle is in an intoxicated state; and
    limits the start operation of the vehicle in a case in which the alcohol level indicates that the driver is in the intoxicated state.

6. The vehicle control device according to claim 1, further comprising a memory that stores information to identify the driver from the speech data.

7. A vehicle control method comprising:
    acquiring speech data from a speech of a speaker;
    acquiring image data including an image of the speaker, the image data including a complexion, a facial expression, and a motion of the speaker;
    determining whether or not the speaker indicated by the speech data is a driver;
    determining, using an alcohol level determining model, an alcohol level based on the speech data and the complexion, the facial expression, and the motion of the speaker from the image data;
    acquiring the speech data from speech for performing a start operation, the start operation being an operation performed by the driver with respect to a vehicle to start driving the vehicle, wherein the start operation is performed by the speech of the driver;

determining whether the speaker is in an intoxicated state outside of the vehicle, based on the alcohol level;

upon determination that the speaker is in an intoxicated state outside of the vehicle, restricting an operation of opening a driver's door of the vehicle;

upon determination that the speaker is not in an intoxicated state outside of the vehicle, and after an opening of the driver's door of the vehicle, determining whether the speaker is in an intoxicated state in a driver's seat of the vehicle based on the alcohol level; and upon determination that the speaker is in an intoxicated state in the driver's seat of the vehicle, restricting starting of an engine of the vehicle.

8. The method of claim 7, wherein the acquiring of the image data is performed in response to the acquiring of the speech data from the speech for performing the start operation.

9. The vehicle control method of claim 7, further comprising:

in response to acquiring the speech data from the speech for performing the start operation, acquiring the alcohol level indicating whether or not the driver attempting to start driving the vehicle is in an intoxicated state; and limiting the start operation of the vehicle in a case in which the alcohol level indicates that the driver is in the intoxicated state.

10. The vehicle control method of claim 7, further comprising storing information to identify the driver from the speech data.

11. A non-transitory computer readable medium storing a vehicle control program causing a computer to execute a process for controlling a vehicle, the process comprising:

acquiring speech data from a speech of a speaker;

acquiring image data including an image of the speaker, the image data including a complexion, a facial expression, and a motion of the speaker;

determining whether or not the speaker indicated by the speech is a driver;

determining, using an alcohol level determining model, an alcohol level based on the speech data and the complexion, the facial expression, and the motion of the speaker from the image data;

acquiring the speech data from speech for performing a start operation, the start operation being an operation performed by the driver with respect to the vehicle to start driving the vehicle, wherein the start operation is performed by the speech of the driver;

determining whether the speaker is in an intoxicated state outside of the vehicle, based on the alcohol level;

upon determination that the speaker is in an intoxicated state outside of the vehicle, restricting an operation of opening a driver's door of the vehicle;

upon determination that the speaker is not in an intoxicated state outside of the vehicle, and after an opening of the driver's door of the vehicle, determining whether the speaker is in an intoxicated state in a driver's seat of the vehicle, based on the alcohol level; and upon determination that the speaker is in an intoxicated state in the driver's seat of the vehicle, restricting starting of an engine of the vehicle.

12. The non-transitory computer readable medium of claim 11 storing the vehicle control program causing the computer to execute the process for controlling the vehicle, the process further comprising:

wherein the acquiring of the image data is performed in response to the acquiring of the speech data from the speech for performing the start operation.

13. The non-transitory computer readable medium of claim 11, the process further comprising:

in response to acquiring the speech data from the speech for performing the start operation, acquiring the alcohol level indicating whether or not the driver attempting to start driving the vehicle is in an intoxicated state; and limiting the start operation of the vehicle in a case in which the alcohol level indicates that the driver is in the intoxicated state.

14. The non-transitory computer readable medium of claim 11, the process further comprising:

storing information to identify the driver from the speech data.

* * * * *